United States Patent
Chen et al.

(10) Patent No.: US 11,347,827 B2
(45) Date of Patent: May 31, 2022

(54) HYBRID MATRIX MULTIPLICATION PIPELINE

(71) Applicant: Advanced Micro Devices, Inc., Santa Clara, CA (US)

(72) Inventors: Jiasheng Chen, Orlando, FL (US); Qingcheng Wang, Shanghai (CN); Yunxiao Zou, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 149 days.

(21) Appl. No.: 16/287,013

(22) Filed: Feb. 27, 2019

(65) Prior Publication Data

US 2020/0272687 A1 Aug. 27, 2020

(30) Foreign Application Priority Data

Feb. 21, 2019 (CN) .......................... 201910129929.7

(51) Int. Cl.
*G06F 17/16* (2006.01)
*G06N 20/00* (2019.01)
*G06F 5/01* (2006.01)

(52) U.S. Cl.
CPC .............. *G06F 17/16* (2013.01); *G06F 5/015* (2013.01); *G06N 20/00* (2019.01)

(58) Field of Classification Search
CPC ........ G06F 17/16; G06F 5/015; G06F 7/5443; G06F 5/012; G06F 7/483; G06F 9/30036; G06F 9/3887; G06N 20/00
USPC ................................ 708/607, 209, 514, 520
See application file for complete search history.

(56) References Cited

U.S. PATENT DOCUMENTS

| | | | | |
|---|---|---|---|---|
| 5,195,050 A | * | 3/1993 | Hsu | G06F 17/16 708/420 |
| 5,586,070 A | * | 12/1996 | Purcell | G06F 7/5324 708/620 |
| 6,484,193 B1 | | 11/2002 | Choe et al. | |
| 6,490,607 B1 | | 12/2002 | Oberman | |
| 2017/0093466 A1 | * | 3/2017 | Nieman | H04L 25/0202 |
| 2019/0244141 A1 | * | 8/2019 | Sodani | G06N 20/00 |
| 2020/0334038 A1 | * | 10/2020 | Anders | G06F 9/3016 |

* cited by examiner

*Primary Examiner* — Tan V Mai
(74) *Attorney, Agent, or Firm* — Kowert Hood Munyon Rankin and Goetzel PC; Rory D. Rankin

(57) ABSTRACT

Systems, apparatuses, and methods implementing a hybrid matrix multiplication pipeline are disclosed. A hybrid matrix multiplication pipeline is able to execute a plurality of different types of instructions in a plurality of different formats by reusing execution circuitry in an efficient manner. For a first type of instruction for source operand elements of a first size, the pipeline uses N multipliers to perform N multiplication operations on N different sets of operands, where N is a positive integer greater than one. For a second type of instruction for source operand elements of a second size, the N multipliers work in combination to perform a single multiplication operation on a single set of operands, where the second size is greater than the first size. The pipeline also shifts element product results in an efficient manner when implementing a dot product operation.

20 Claims, 9 Drawing Sheets

HYBRID MATRIX MULTIPLICATION PIPELINE

PRIORITY INFORMATION

This application claims benefit of priority to Chinese Application No. 201910129929.7, entitled "HYBRID MATRIX MULTIPLICATION PIPELINE", filed Feb. 21, 2019, the entirety of which is incorporated herein by reference in its entirety.

BACKGROUND

Description of the Related Art

A matrix operations unit typically takes up a large amount of area within a processor die. Additionally, performing matrix operations on matrix operations units usually consumes a large amount of power, especially when matrix operations are performed repeatedly on a portion of data at a time on large input datasets. It is noted that an "operations unit" can also be referred to herein as a "pipeline" or an "execution pipeline". Software applications that include instructions for operating on matrices often include many different types of instructions. For example, dot product instructions, floating point instructions of different sizes of operands, fused multiply-add (FMA) instructions, and other types of instructions can be included in different types of software applications. Implementing separate execution pipelines in order to support all of these different types of instructions can take up a large amount of area in a processor die. Additionally, many of these execution pipelines can consume a large amount of power when executing instructions.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
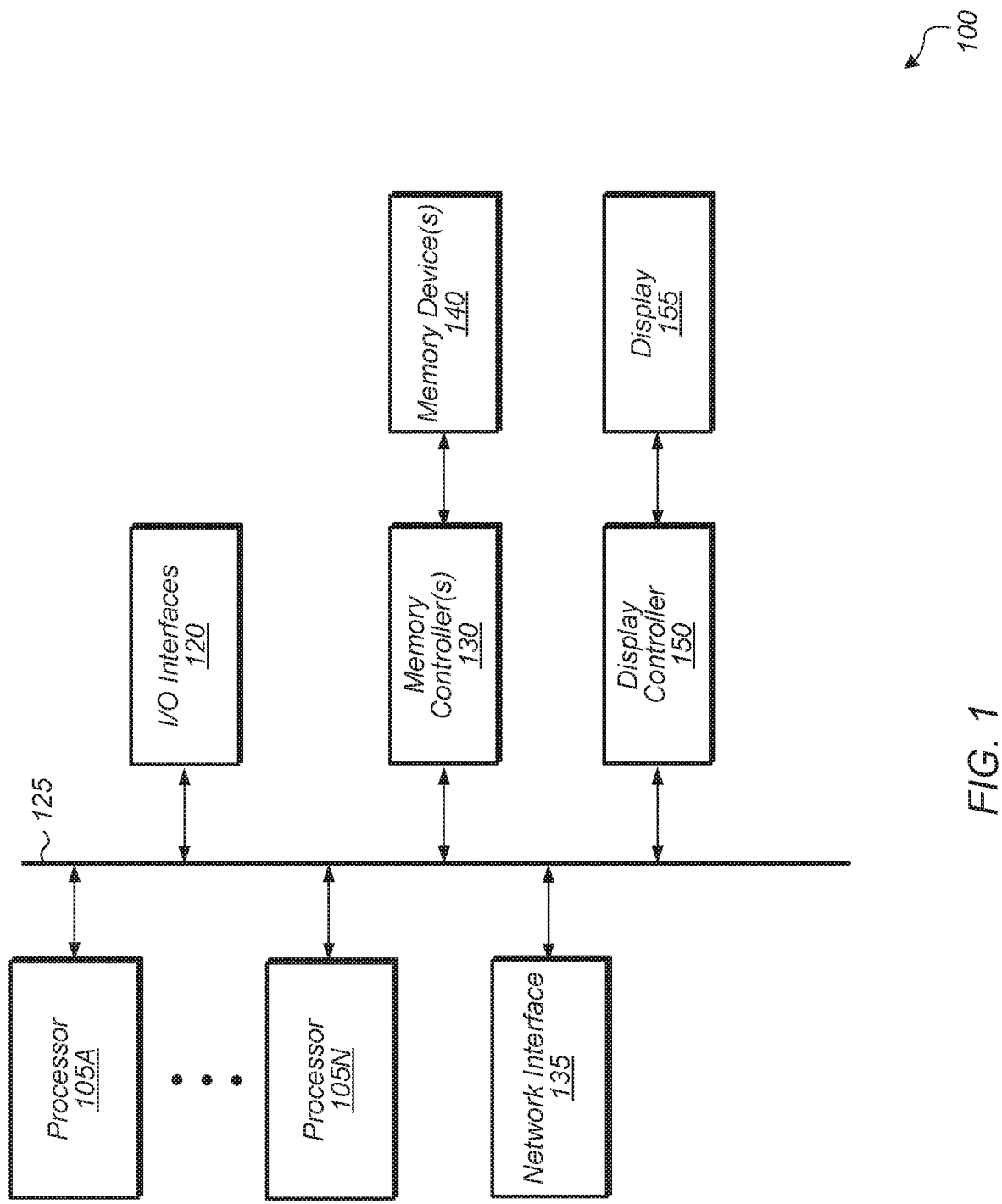
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a hybrid multi-instruction type matrix multiplication pipeline are disclosed herein. In one implementation, a hybrid multi-instruction type matrix multiplication pipeline is able to execute a plurality of different types of instructions on a plurality of different source operand formats while also reusing execution circuitry in an efficient manner. For a first type of instruction for source operand elements of a first size, the pipeline uses N multipliers to perform N multiplication operations on N different sets of operands, where N is a positive integer greater than one. For a second type of instruction for source operand elements of a second size, the N multipliers work in combination to perform a single multiplication operation on a single set of operands, where the second size is greater than the first size.

In one implementation, for dot product instructions, the pipeline multiplies a first source operand with N elements by a second source operand with N elements to generate N element products. When adding a third source operand to the N element products, the pipeline only right-shifts N−1 element products while right-shifting or left-shifting the third source operand based on a comparison with the maximum element product. This allows the adder to be implemented with shifting circuitry that is able to meet strict timing constraints.

For example, in one implementation, when executing a dot product instruction (i.e., (sum of $A_i*B_i$ for i=0 to N−1)+C), the pipeline generates a plurality of element product results from a plurality of multiplication operations of a first set of source operand elements (i.e., source A) and a second set of source operand elements (i.e., source B). The pipeline determines a maximum element product result of the plurality of element product results. The processor performs a right-shift operation for each element product result other than the maximum element product result. Also, the processor performs a left-shift or a right-shift operation for a third source operand (i.e., source C) depending on whether the third source operand is greater than or less than the maximum element product result. It is assumed for the purposes of this discussion that the first set of source operand elements and the second set of source operand elements have a first size (e.g., 16-bit floating point (FP16)) and that the third source operand is an operand of a second size (e.g., 32-bit floating point (FP32)).

In one implementation, performing a left-shift operation of the third source operand responsive to determining that an exponent of the third source operand is greater than an exponent of the maximum element product involves multiple steps. A first step is determining a number "N" of bits which the third source operand should be shifted left, where N is a positive integer. A second step is right-shifting the third source operand by M−N bits, where M an integer which is a power of two, and wherein M is greater than N. A third step is left-shifting the result of the second step by M bits. Performing the left-shift operation of the third source operand in this manner helps to reduce the size of the adder and simplifies the ability of the adder to meet timing requirements.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components, omits one or more of the illustrated components, and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
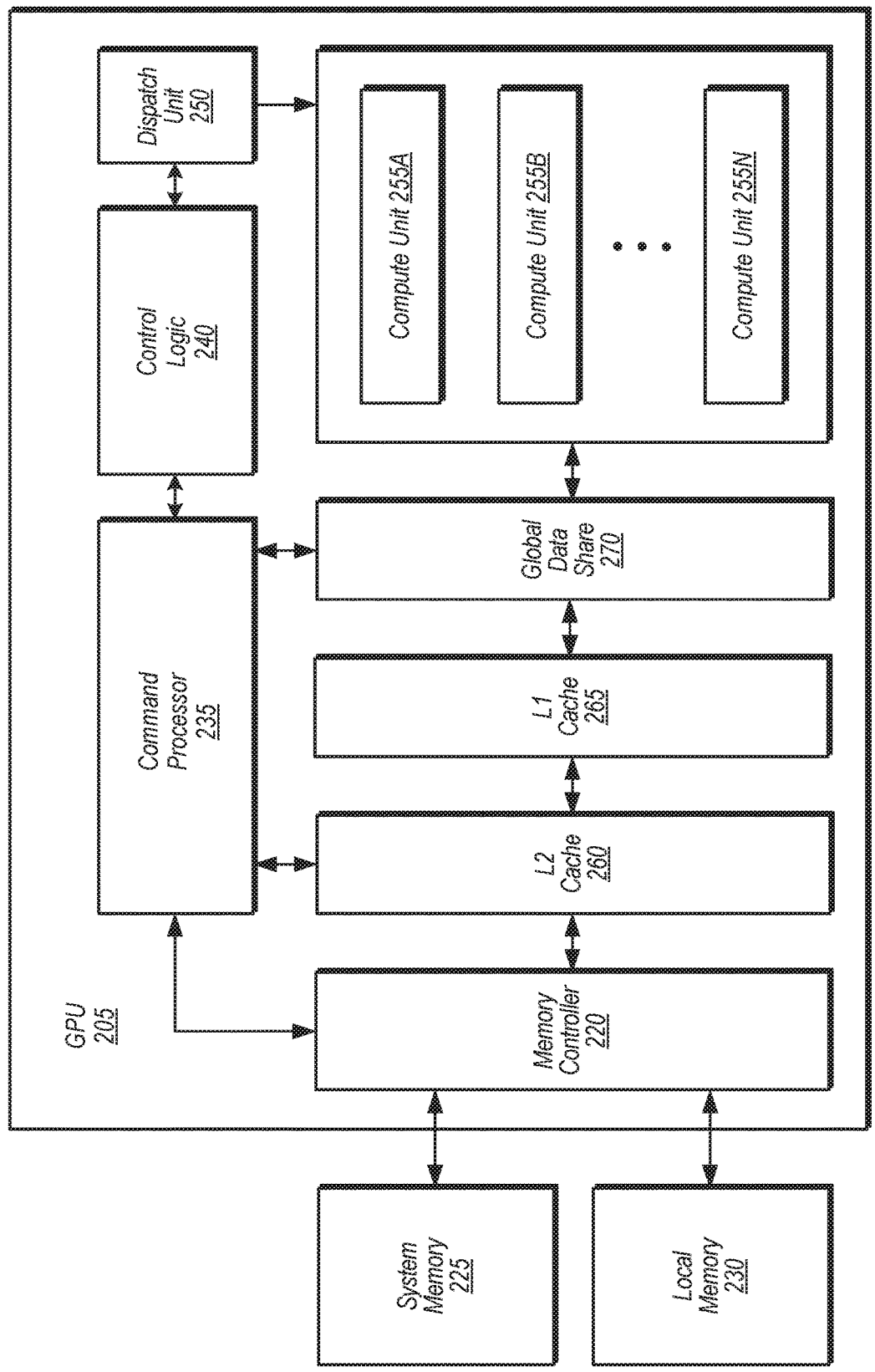
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. In one implementation, each compute unit 255A-N includes an adaptive multi-instruction type matrix operations unit. For example, the adaptive multi-instruction type matrix operations unit performs matrix multiplication operations, dot product operations, and fused multiply add (FMA) operations. Additionally, in various implementations, the adaptive, multi-instruction type matrix operations unit performs other types of matrix, arithmetic, or bitwise operations. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
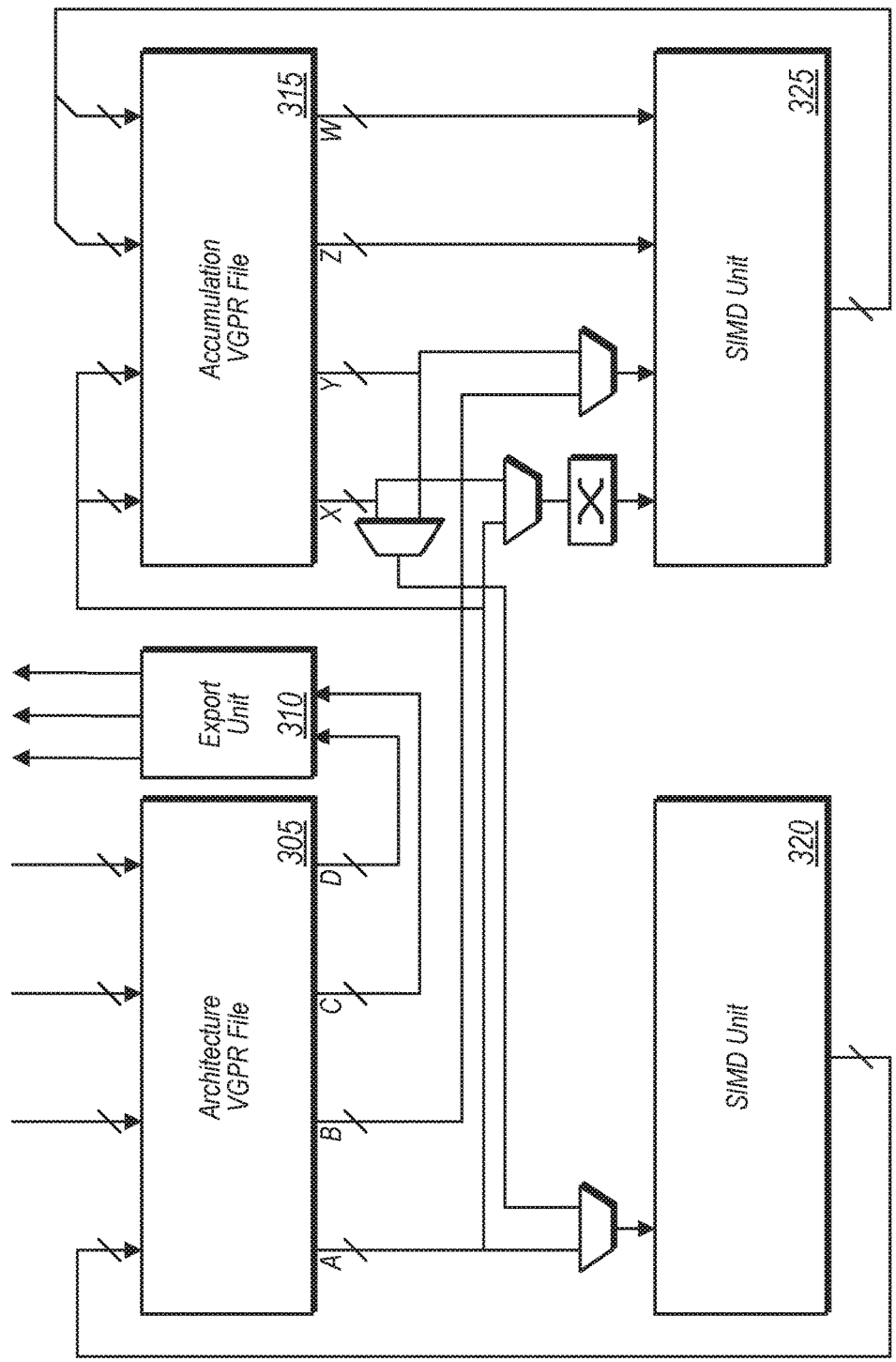
FIG. 3 is a block diagram of one implementation of an adaptive, multi-instruction type matrix operations unit.

Referring now to FIG. 3, a block diagram of one implementation of a hybrid multi-instruction type matrix operations unit 300 is shown. In one implementation, each compute unit 255A-N includes the circuitry of hybrid multi-instruction type matrix operations unit 300. In one implementation, hybrid multi-instruction type matrix operations unit 300 includes at least architecture vector general purpose register (VGPR) file 305, export unit 310, accumulation VGPR file 315, single instruction, multiple data (SIMD) unit 320, and SIMD unit 325. It should be understood that hybrid multi-instruction type matrix operations unit 300 includes any number of other components which are not shown to avoid obscuring the figure. Additionally, in other implementations, hybrid multi-instruction type matrix operations unit 300 is organized in other suitable manners.

In one implementation, SIMD unit 320 is a floating point unit for performing various floating point operations and SIMD unit 325 is a matrix unit for performing various matrix operations (e.g., dot product operations, matrix multiplication operations). In one implementation, each separate input shown connected to architecture VGPR file 305 and accumulation VGPR file 315 has 16 lanes of 32 bits each. In other implementations, the inputs have other numbers of lanes of other bit-widths. In various implementations, SIMD unit 325 operates on input matrix elements of different formats to execute a variety of different instructions. Accordingly, the processing elements of SIMD unit 325 have the flexibility and programmability which allows them to adapt to the different types of instructions being executed.

Figure 4:
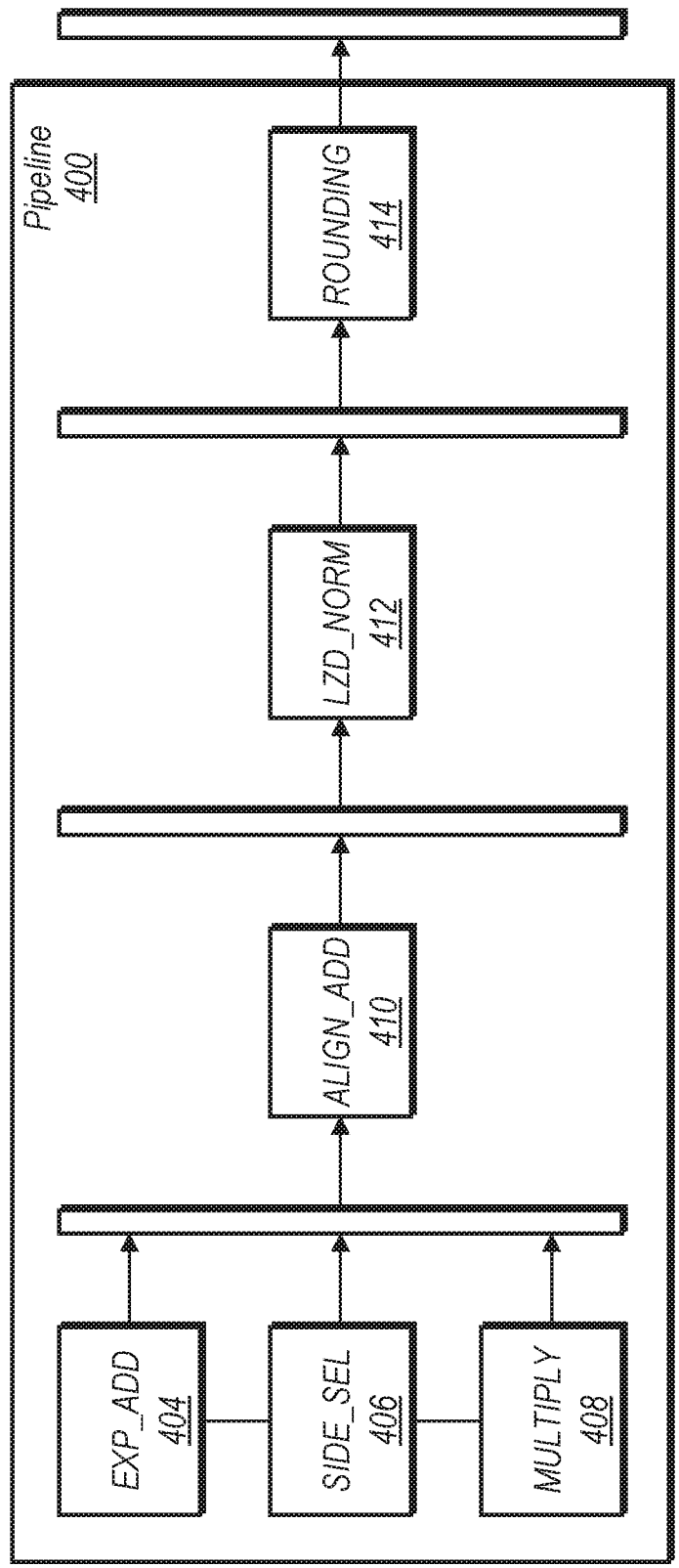
FIG. 4 is a block diagram of one implementation of a fused-multiply add (FMA) and dot product operation pipeline.

Turning now to FIG. 4, a diagram of one implementation of a fused-multiply add (FMA) and dot product operation pipeline 400 is shown. In one implementation, SIMD unit 325 (of FIG. 3) includes a plurality of instances of pipeline 400. In one implementation, pipeline 400 is designed to perform multiple different types of operations. It is noted that pipeline 400 can also be referred to herein as a "multi-instruction type matrix multiplication pipeline" or a "hybrid matrix multiplication pipeline".

One of the operations that pipeline 400 is able to perform is a dot product operation. For example, a dot product operation multiplies a first set of values by a second set of values, calculates the sum, and then adds a third value to the sum. For example, a four-element dot product operation calculates the following equation: $D=A[0]*B[0]+A[1]*B[1]+A[2]*B[2]+A[3]*B[3]+C$. In one implementation, each of the A and B operands is encoded as a 16-bit floating point value (i.e., FP16) while the C operand and the D result operand are encoded as 32-bit floating point values (i.e., FP32). In other implementations, the A, B, C, and D operands are encoded with other numbers of bits and/or in other formats. It is noted that the A, B, and C operands can also be referred to herein as first, second, and third operands, respectively. Pipeline 400 is also able to perform other types of operations, such as floating point operations, fused multiply-add (FMA) operations, fused multiply-accumulate operations, and other operations.

In one implementation, pipeline 400 is divided into four stages. The first stage includes the exponent difference calculation (or EXP_ADD) unit 404, a C operand mantissa multiplexer (or SIDE_SEL) unit 406, and the mantissa multiplier (or multiply) unit 408 for the A and B operands. The results of the mantissa multiplication in the first stage are processed by the second stage in alignment (or ALIGN_ADD) unit 410. The second stage performs the mantissa alignment by shifting the mantissa results from the mantissa multiplier unit 408 and adding the shifted mantissa results. The third stage performs leading zero detection and normalization in LZD_NORM unit 412. The fourth stage performs the rounding and the final result multiplexing in rounding unit 414. It should be understood that pipeline 400 is merely indicative of one particular implementation of a hybrid matrix multiplication pipeline. In other implementations, pipeline 400 can be divided into other numbers of stages, include other numbers and/or types of units, and/or be organized in other suitable manners.

Figure 5:
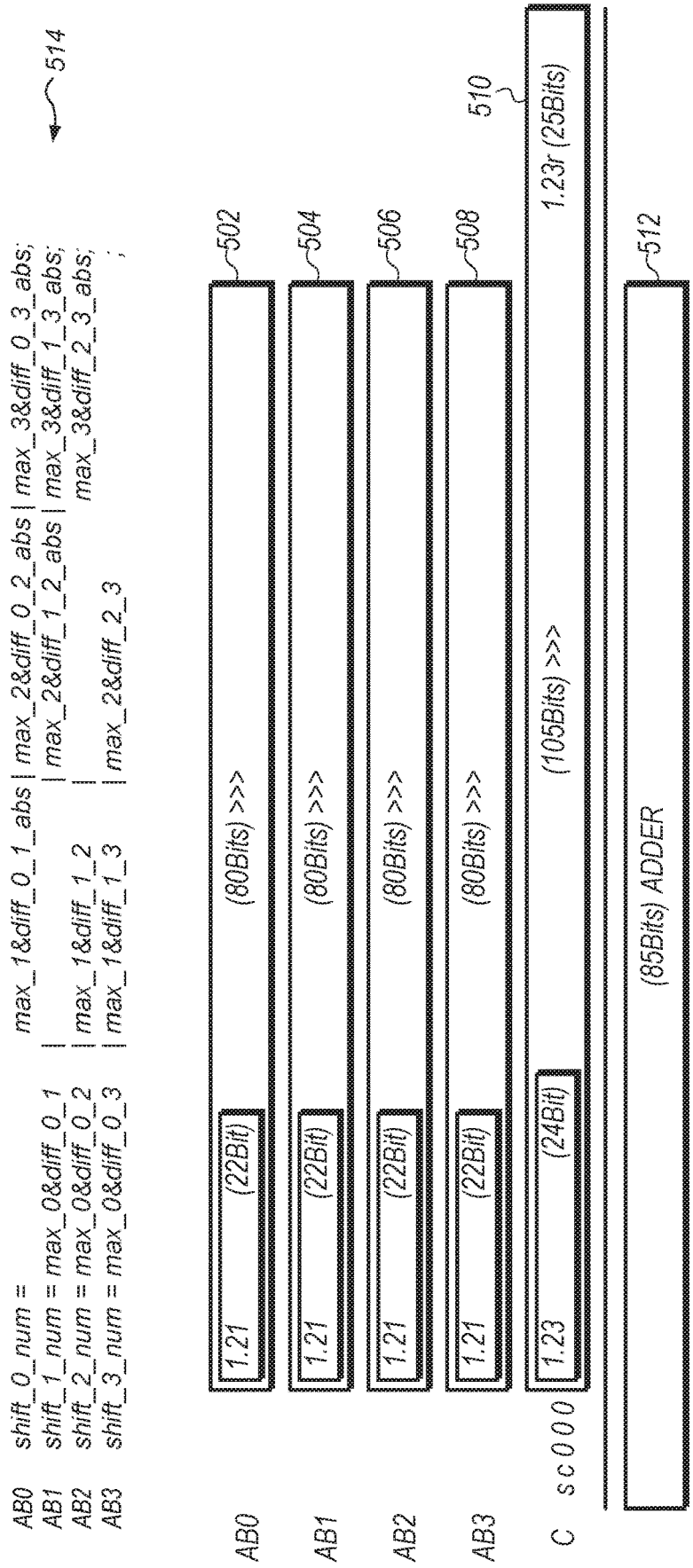
FIG. 5 is a diagram of one implementation of the alignment of element products when performing a dot product operation.

Referring now to FIG. 5, a diagram of one implementation of the alignment of element products when performing a dot product operation is shown. In one implementation, the input A and B operands are stored in a 16-bit floating point (i.e., FP16) representation. When two FP16 operands are multiplied together, the resultant product has a maximum exponent of 0x1E+0x1E−0x0E=0x2E and a minimum exponent of 0x01+0x01−0x0E=−0x0C. In one implementation, the C operand is stored in a 32-bit floating point (i.e., FP32) representation, which has an exponent range of [0x01, 0xFE]. In the prior art, one solution for implementing an adder for a dot product operation involves shifting the individual AB products and C operands together in a single stage. For this prior art solution, the circuitry finds the maximum value among the individual AB products and the C operand, and then right shifts the other four mantissas to align with the maximum value. With this solution, the full fused adder width would be 0xFE−(−0x0C)+'d24=d290 bits, which would be challenging to implement from a timing point of view. It is noted that the 'd notation indicates a decimal value and the 0x notation indicates a hexadecimal value.

In one implementation, rather than executing the above solution, an improved solution only right shifts the individual AB products AB0, AB1, AB2, and AB3 as shown in rectangles 502, 504, 506, and 508, respectively. In this improved solution, the C operand, shown in rectangle 510, will be right or left shifted compared with the exponent of the maximum AB product. After shifting, the individual AB products AB0, AB1, AB2, and AB3 and the C operand are added together to generate the result mantissa 512. With this approach, the full fused adder width would be 0x2E−(−0x0C)+'d22=80 bits. This full fused adder width is an improvement from a timing point of view as compared to the prior art solution. The number of bits that the individual AB products AB0, AB1, AB2, and AB3 are right-shifted is shown in equations 514 at the top of FIG. 5. It is noted that an "individual AB product" is also referred to herein as an "element product" or an "AB partial product". For example, the product (i.e., AB0) of the first source A operand element multiplied by the first source B operand element can be referred to as either an individual AB product, AB partial product, element product result, or an element product.

For example, the amount that AB0 partial product is shifted is shown as shift_0_num, and shift_0_num is calculated according to the formula shift_0_num= max_1&diff_0_1_abs|max_2&diff_0_2_abs|max_3&diff_0_3_abs. The value max_1 is true if the individual AB product AB1 has the maximum exponent value of the four element products. The other values max_0, max_2, and max_3 are true if the AB0, AB2, or AB3 partial product, respectively, has the maximum exponent value of the four partial products. The diff_0_1_abs value is equal to the difference, in the number of bits between their exponent values, of the AB0 partial product and the AB1 partial product. Similarly, diff_0_2_abs and diff_0_3_abs are equal to the difference between the exponents of the AB0 partial product and the AB2 partial product and the difference between the exponents of the AB0 partial product and the AB3 partial product, respectively. The other shift values for the other element products are calculated in a similar manner.

In one implementation, when performing a dot product operation, the partial products of AB0, AB1, AB2, and AB3 which are not the maximum element product are right-shifted to align with the maximum element product. In one implementation, if the C operand needs to be shifted to the left to align with the maximum element product, then a right-shift operation is performed to implement this left shift for the C operand. For example, a left-shift of 6 bits can be implemented by right-shifting 26 bits and then left-shifting 32 bits. In one implementation, when the left-shift number is greater than 27 bits, then the shifting to the left is clamped to −27 since the final result of the dot product operation will always be equal to the C operand in this case.

In one implementation, both left-shifts and right-shifts of the C operand mantissa will make use of a right-shifter. The shift amount will be determined based on a comparison of the C operand exponent field to the exponent field of the largest AB partial product. When the C operand mantissa needs to be shifted left by some number of bits (i.e., shift number) so as to align with the maximum AB partial product, first, a right shift of (32—shift number) is performed. Then, a left-shift of 32 bits is performed on the C operand mantissa. For example, if the C operand mantissa should be left-shifted by 6 bits, then a right shift of 26 bits is performed followed by a left shift of 32 bits. Alternatively, the left shift of 32 bits is performed first followed by the right-shift of 26 bits. After these two shifts have been performed, the end result will be a left-shift of the C operand mantissa by 6 bits.

Figure 6:
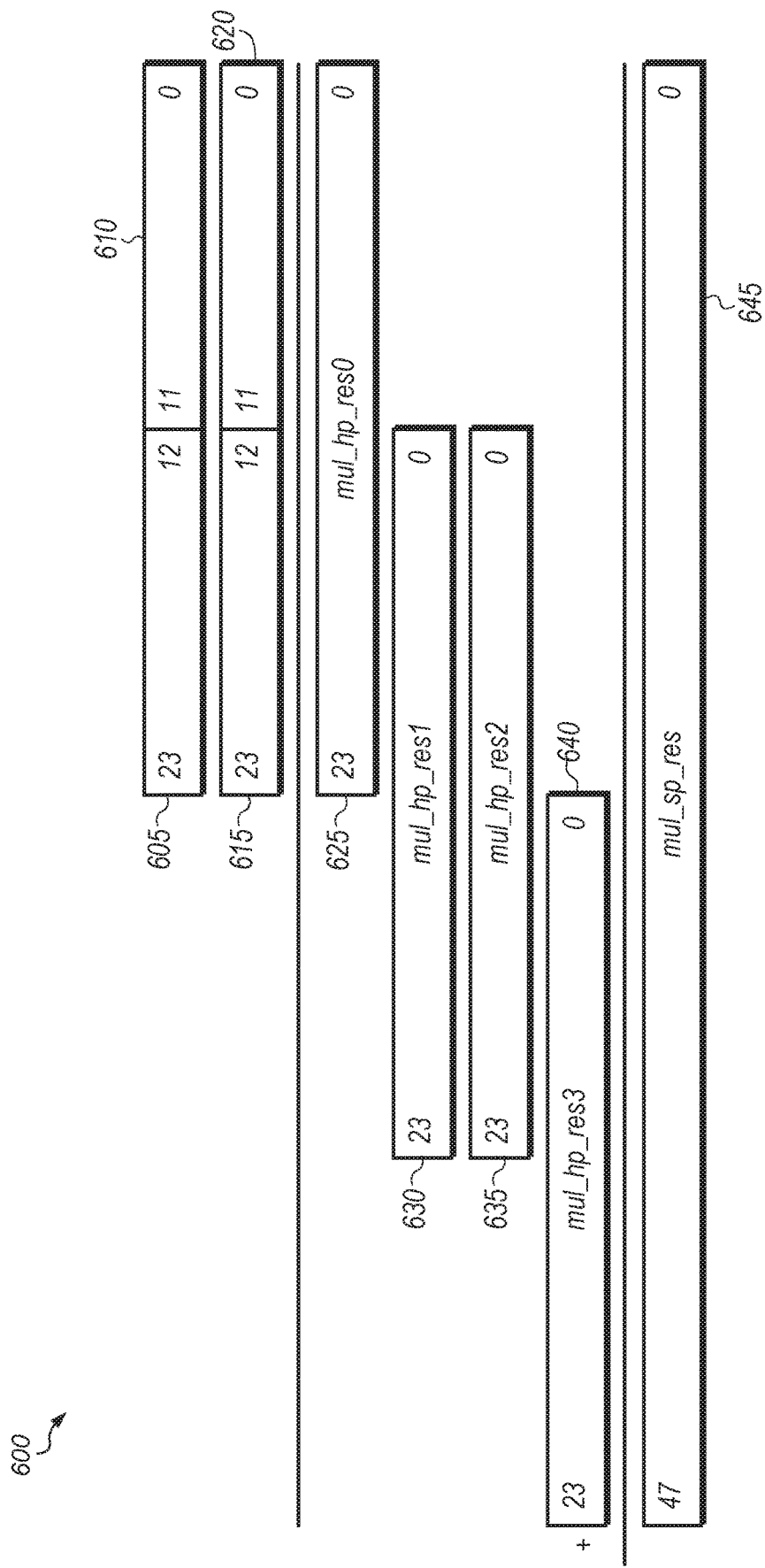
FIG. 6 is a diagram of one implementation of performing a fused-multiply add operation on a dot product pipeline.

Turning now to FIG. 6, a diagram of one implementation of performing a fused-multiply add (FMA) operation 600 on a dot product pipeline is shown. In one implementation, in order to perform a FMA 32-bit floating point (FP32) operation on a 4-element dot product F32 F16 pipeline, each of the four 12-by-12-bit multipliers of the pipeline are utilized to perform a multiplication operation on a portion of the FP32 source operands. The results of these four multiplication operations on portions of the FP32 source operands, after the appropriate shifts have been applied, are then combined together to generate the product of the FMA FP32 operation. In one implementation, FMA operation 600 is being performed on a first source operand and a second source operand. The first source operand is the concatenation of portions 605 and 610 while the second source operand is the concatenation of portions 615 and 620.

After the four multipliers have performed the four multiplication operations on corresponding input portions 605, 610, 615, and 620, the products of these multiplication operations are shifted based on which portions were multiplied together. In one implementation, the product 635 of inputs 610 and 615 is shifted left by 12 bits. In this implementation, the product 640 of inputs 605 and 615 is shifted 24 bits to the left, the product 630 of inputs 605 and 620 is shifted 12 bits to the left, while the product 625 of inputs 610 and 620 is not shifted. Generally speaking, the products 630 and 635 are shifted left a first number of bits and the product 640 is shifted left a second number of bits, where the second number of bits is greater than the first number of bits and at most twice as much the first number of bits. After their corresponding shifts, the products 625, 630, 635, and 640 are added together to generate sum 645. Sum 645 is the result of the multiplication operation between the source operands and is represented in the FP32 format.

In other implementations, other numbers of multipliers can be combined together to execute a single multiplication operation on other portions of source operands in a similar fashion to that shown in FIG. 6. For example, in another implementation, eight multipliers perform multiplication operations on separate portions of source operands. After shifting the results of these eight multiplication operations by the appropriate amounts, the results are added together to generate a product of the source operands. In other implementations, other numbers (e.g., 16, 32) of multipliers are combined together to perform a single multiplication operation on a pair of source operands. By reusing multipliers to perform multiplication operations and performing different combinations on the element products, a single matrix multiplication pipeline is able to operate on source operands that are represented in a plurality of different types of formats.

Figure 7:
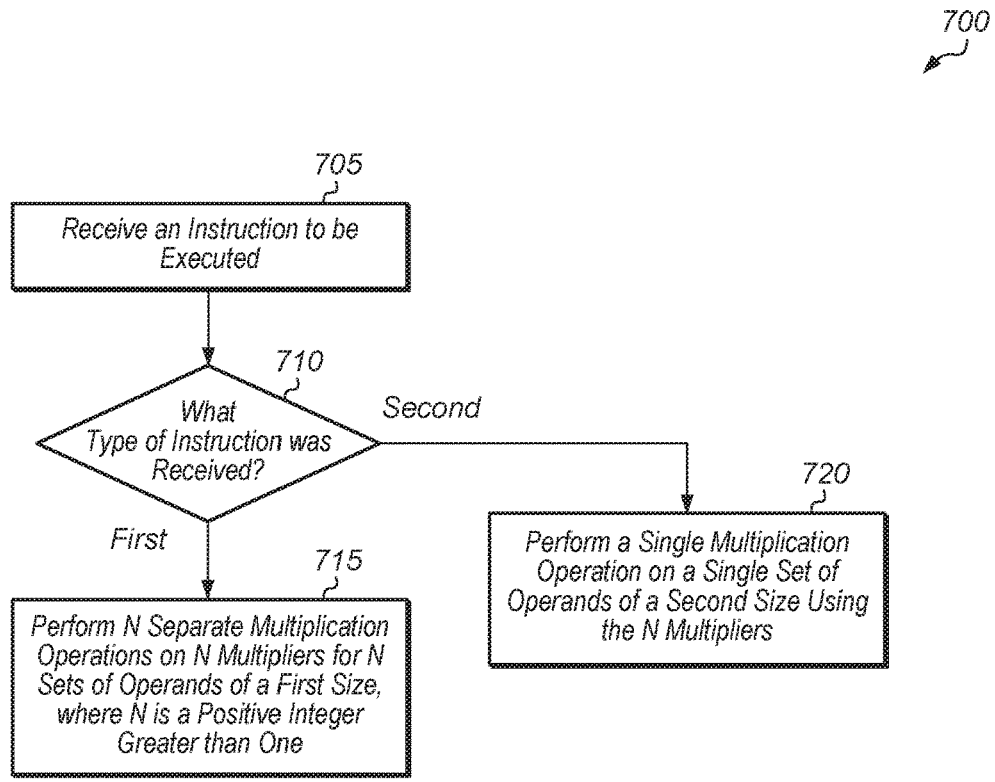
FIG. 7 is a generalized flow diagram illustrating one implementation of a method for performing multiple different types of instructions on a multi-instruction type matrix multiplication pipeline.
Figure 8:
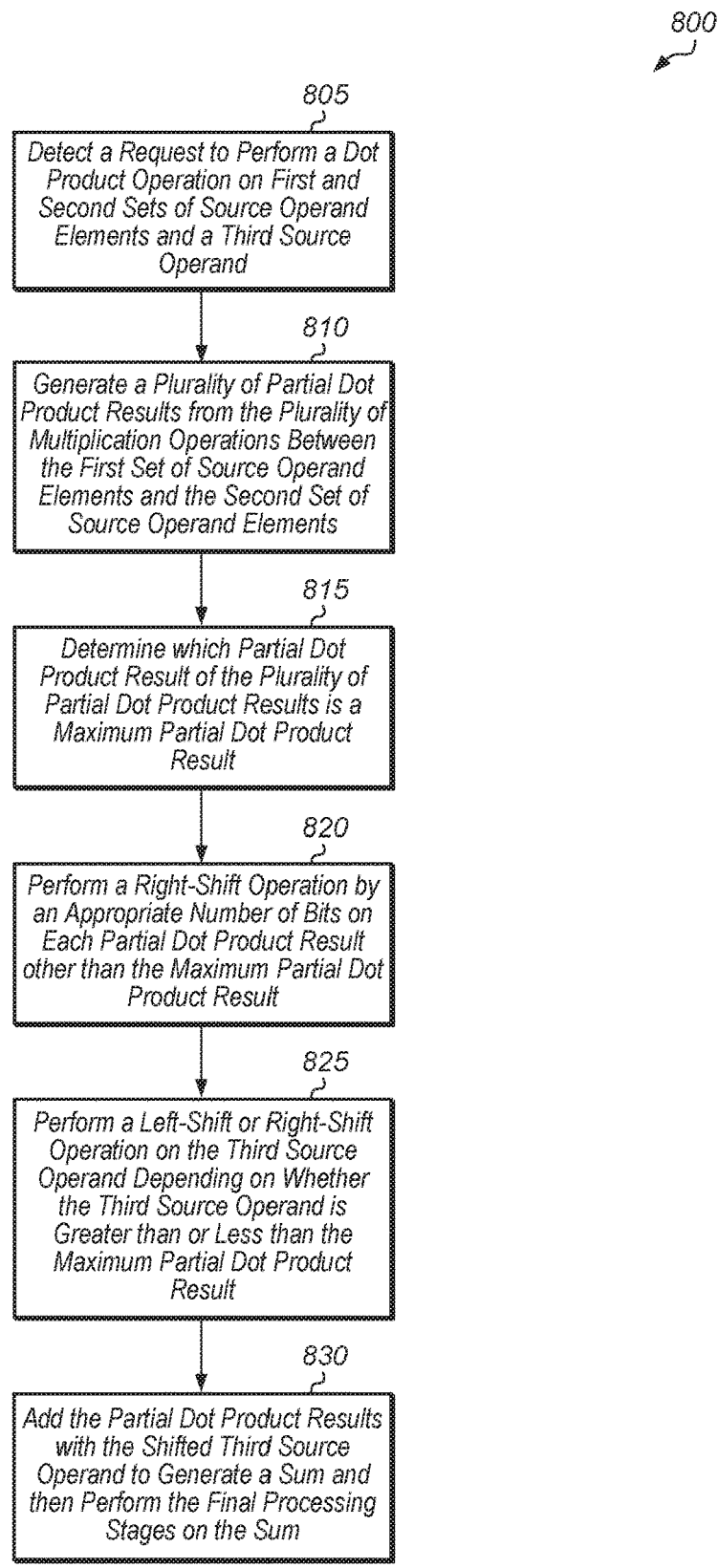
FIG. 8 is a generalized flow diagram illustrating one implementation of a method for performing a dot product operation.
Figure 9:
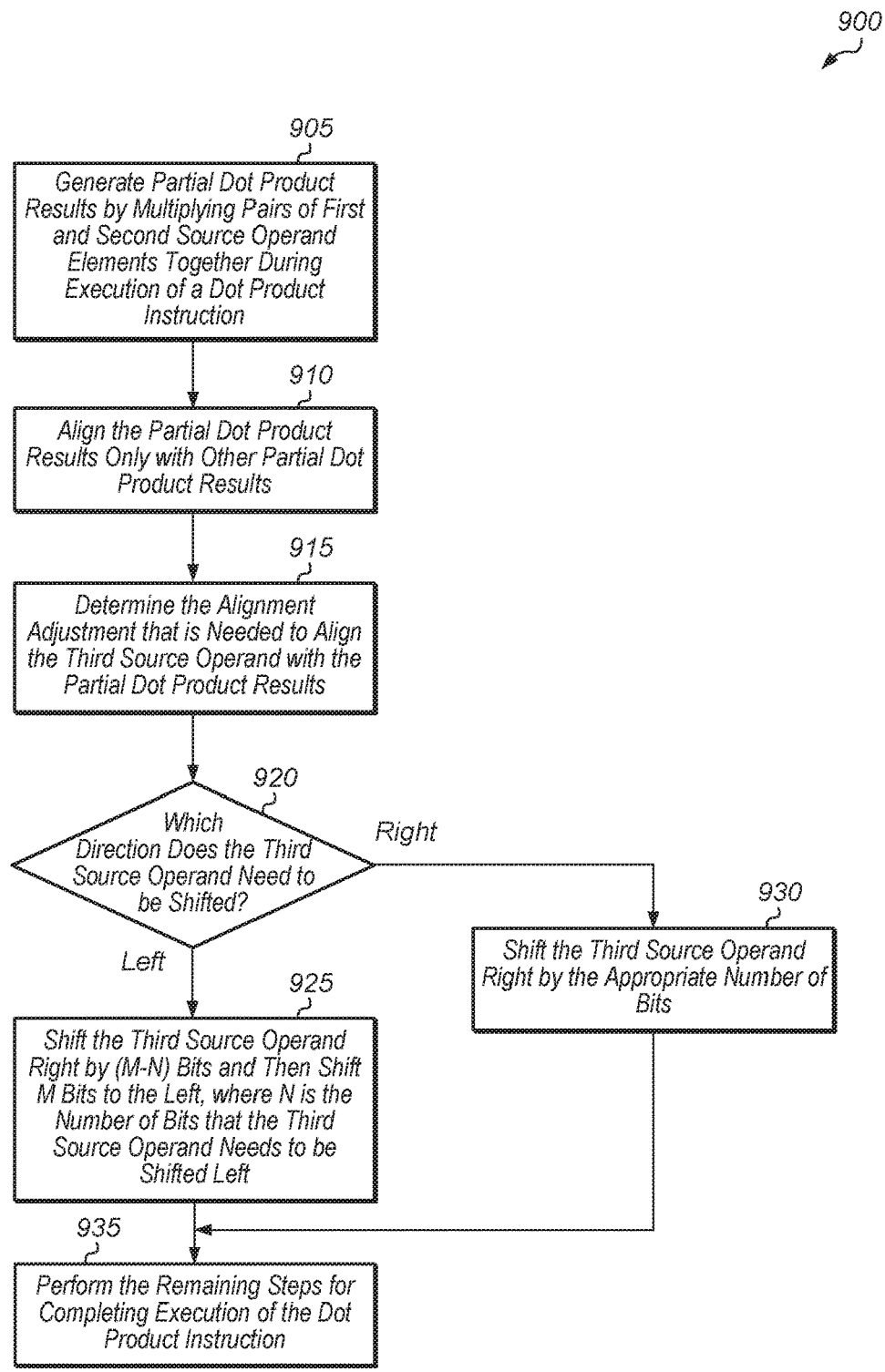
FIG. 9 is a generalized flow diagram illustrating one implementation of a method for aligning first and second source operand element product results with a third source operand during execution of a dot product instruction.

Referring now to FIG. 7, one implementation of a method 700 for performing multiple different types of instructions on a hybrid matrix multiplication pipeline is shown. For purposes of discussion, the steps in this implementation and of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A hybrid matrix multiplication pipeline receives an instruction to be executed (block 705). If the instruction is a first type of instruction (conditional block 710, "first" leg), then the hybrid matrix multiplication pipeline performs N separate multiplication operations on N multipliers for N sets of operands of a first size, where N is a positive integer greater than one (block 715). For example, in one implementation, the first type of instruction is a dot product instruction which operates on N pairs of A and B operands. In one implementation, each A and B operand is in the FP16 format. In other implementations, the A and B operands are represented in other types of formats. In one implementation, N is equal to four, with the hybrid matrix multiplication pipeline including four multipliers, with each of the four multipliers multiplying a given A operand by the corresponding B operand. In other implementations, N is equal to other numbers. After block 715, method 700 ends.

If the instruction is a second type of instruction (conditional block 710, "second" leg), then the hybrid matrix multiplication pipeline performs a single multiplication operation on a single set of operands of a second size using the N multipliers (block 720). For example, in one implementation, the second type of instruction is a fused multiply-add (FMA) instruction and the single set of operands are represented in the FP32 format. In other implementations, the second type of instruction is any of various other types of instructions and the single set of operands are represented in any of various other types of formats. In one implementation, N is equal to four and the hybrid matrix multiplication pipeline uses the four multipliers on separate portions of the input operands to generate a result which is equivalent to performing a single multiplication operation on a single multiplier. In other implementations, N is equal to any of various other numbers and the hybrid matrix multiplication pipeline uses other number of multipliers to operate on the single set of operands. One example of performing a single multiplication operation on a single set of operands of a second size using N multipliers is described in further detail below in method 800 (of FIG. 8). After block 720, method 700 ends.

By using a single hybrid matrix multiplication pipeline which supports executing different types of instructions, the processor does not need to implement multiple separate execution pipelines, thus reducing the total area required to support the different types of instructions. It is noted that in other implementations, conditional block 710 can also check whether the instruction is a third type of instruction, a fourth type of instruction, and so on. Accordingly, it should be understood that while the hybrid matrix multiplication pipeline in method 700 is described as being able to perform two different types of instructions, this is merely indicative of one particular implementation. In other implementations, the hybrid matrix multiplication pipeline can perform three, four, or other numbers of different types of instructions.

In one implementation, the hybrid matrix multiplication pipeline executes instructions which are included within a machine learning application. The machine learning application can be the implementation of a neural network, inference engine, or other type of network or engine. The computing system that includes the hybrid matrix multiplication pipeline generates a result from the execution of the machine learning application. In one implementation, the result is data that identifies a classification ("classification data") of an input dataset into a given category out of a plurality of categories. For example, in one implementation, the input dataset is an image, and the classification identifies a given category to which the image belongs. The data that identifies the classification is then stored for use in further processing. In some embodiments, the classification data is used to modify or otherwise affect display data. For example, in some embodiments the classification data is used to identify an individual or object that appears in a video frame and some type of indication of this classification is then presented on the video display. In other embodiments, the classification data is used to determine how the identified person or object is treated for further processing. For example, if the classification data indicates that the object is a car, then further processing may use this data to predict the location of the car in a later video frame. These and other embodiments are possible and are contemplated. In another implementation, the input dataset is a video, and the classification assigns the video to a given category. In other implementations, the input dataset includes other types of data. In other implementations, other types of results are generated.

Turning now to FIG. 8, one implementation of a method 800 for performing a dot product operation is shown. A hybrid matrix multiplication pipeline (e.g., hybrid matrix multiplication pipeline 400 of FIG. 4) detects a request to perform a dot product operation on first and second sets of source operand elements and a third source operand (block 805). In response to detecting the request, the hybrid matrix multiplication pipeline generates a plurality of element product results from the plurality of multiplication operations between the first set of source operand elements and the second set of source operand elements (block 810). Next, the hybrid matrix multiplication pipeline determines which element product result of the plurality of element product results is a maximum element product result (block 815). For example, the hybrid matrix multiplication pipeline compares the exponents of the element product results to determine which element product result is the maximum element product result.

Then, the hybrid matrix multiplication pipeline performs a right-shift operation by an appropriate number of bits on each element product result other than the maximum element product result (block 820). Next, the hybrid matrix multiplication pipeline performs a left-shift or right-shift operation on the third source operand depending on whether the third source operand is greater than or less than the maximum element product result (block 825). One example for performing block 825 is described in further detail below in the discussion associated with method 900 of FIG. 9. It should be understood that if the exponent of the third source operand is equal to the exponent of the maximum element product result, then the third source operand will not be shifted in this case.

After block 825, the hybrid matrix multiplication pipeline adds the element product results with the shifted third source operand to generate a sum and then the hybrid matrix multiplication pipeline performs the final processing stages on the sum (block 830). For example, in one implementation, the final processing stages include leading zero detection, normalization, rounding, and final result multiplexing. After block 830, method 800 ends.

Referring now to FIG. 9, one implementation of a method 900 for aligning first and second source operand element product results with a third source operand during execution of a dot product instruction is shown. A hybrid matrix multiplication pipeline generates element products by multiplying pairs of first and second source operand elements together during execution of a dot product instruction (block 905). For example, the dot product operation calculates the following equation: (sum (for i=0 to N−1)$A_i*B_i$)+C. For example, for a four-element dot product operation, the output is calculated as $A_0*B_0+A_1*B_1+A_2*B_2+A_3*B_3+C$.

Next, the hybrid matrix multiplication pipeline aligns the element product results only with other element product results (block 910). In other words, the element product results are not aligned with the third source operand in block 910. Then, the hybrid matrix multiplication pipeline determines the alignment adjustment that is needed to align the third source operand with the element product results (block 915). If the third source operand needs to be shifted left (conditional block 920, "left" leg), then the third source operand is shifted right by (M−N) bits and then shifted left by M bits, where N is the number of bits that the third source operand needs to be shifted left (block 925). It is assumed for the purposes of this discussion that M and N are positive integers, M is a power of two, and M is greater than N. In one implementation, M is equal to 32. In other implementations, M is equal to other powers of two (e.g., 16, 64, 128). Then, the remaining steps (e.g., leading zero detection, normalization, rounding) for completing execution of the dot product instruction are performed (block 935). After block 935, method 900 ends. If the third source operand needs to be shifted right (conditional block 920, "right" leg), then the third source operand is shifted to the right by the appropriate number of bits (block 930). Then, the remaining steps for completing execution of the dot product instruction are performed (block 935). If the third source operand does not need to be shifted, then blocks 925 and 930 are skipped.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (MIL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A system comprising:
a processor coupled to a memory storing a plurality of source operands, wherein the processor comprises at least one hybrid matrix multiplication pipeline configured to:
responsive to detecting a request to perform a first type of instruction on the plurality of source operands:
perform a plurality of multiplication operations on a plurality of multipliers to generate a plurality of element product results; and
perform a right-shift operation on at least one of the element product results;
perform a single multiplication operation on the plurality of multipliers responsive to detecting a request to perform a second type of instruction on the plurality of source operands;

wherein the first type of instruction has source operand elements of a first size and the second type of instruction has source operand elements of a second size different from the first size; and generate a result from executing one of the first type of instruction and the second type of instruction.

2. The system as recited in claim 1, wherein the hybrid matrix multiplication pipeline is configured to:

generate a plurality of element product results from the plurality of multiplication operations between a first set of source operand elements and a second set of source operand elements; and determine a maximum element product result of the plurality of element product results.

3. The system as recited in claim 1, wherein responsive to detecting the request to perform the first type of instruction, the hybrid matrix multiplication pipeline is configured to perform a right-shift operation on all but one of the plurality of product element results.

4. The system as recited in claim 3, wherein responsive to determining that a third source operand is greater than the maximum element product result, the hybrid matrix multiplication pipeline is configured to:

determine a number N of bits which the third source operand should be shifted left, wherein N is a positive integer;

right-shift the third source operand by (M−N) bits, wherein M is an integer which is a power of two, and wherein M is greater than N; and left-shift a result of the right-shift by M bits.

5. The system as recited in claim 4, wherein M is a power of two which is greater than or equal to 32.

6. The system as recited in claim 1, wherein responsive to detecting the request to perform the second type of instruction, the hybrid matrix multiplication pipeline is configured to:

perform a plurality of multiplication operations on separate portions of a first source operand and a second source operand;

generate a first result from multiplying a first portion of the first source operand by a first portion of the second source operand;

left-shift, by a first number of bits, a second result generated by multiplying the first portion of the first source operand by a second portion of the second source operand;

left-shift, by a first number of bits, a third result generated by multiplying a second portion of the first source operand by the first portion of the second source operand;

left-shift, by a second number of bits, a fourth result generated by multiplying the second portion of the first source operand by the second portion of the second source operand; and add together, subsequent to shifting, the first result, second result, third result, and fourth result to generate a product of the first source operand and the second source operand.

7. The system as recited in claim 6, wherein the second number of bits is greater than the first number of bits, and wherein the second number of bits is at most twice as much as the first number of bits.

8. A method comprising:

responsive to detecting a request to perform a first type of instruction on a plurality of source operand elements:

performing, by a hybrid matrix multiplication pipeline of a computing system, a plurality of multiplication operations on a plurality of multipliers to generate a plurality of element product results; and performing a right-shift operation on at least one of the element product results;

performing, by the hybrid matrix multiplication pipeline, a single multiplication operation on the plurality of multipliers responsive to detecting a request to perform a second type of instruction on the plurality of source operand elements, wherein the first type of instruction has source operand elements of a first size and the second type of instruction has source operand elements of a second size different from the first size; and generating, by the computing system, a result from executing one of the first type of instruction and the second type of instruction.

9. The method as recited in claim 8, wherein responsive to detecting the request to perform the first type of instruction, the method further comprising:

generating a plurality of element product results from the plurality of multiplication operations between a first set of source operand elements and a second set of source operand elements;

determining a maximum element product result of the plurality of element product results.

10. The method as recited in claim 9, further comprising performing a right-shift operation on each element product result other than the maximum element product result.

11. The method as recited in claim 10, wherein responsive to determining that a third source operand is greater than the maximum element product result, the method further comprising:

determining a number N of bits which the third source operand should be shifted left, wherein N is a positive integer;

right-shifting the third source operand by (M−N) bits, wherein M is an integer which is a power of two, and wherein M is greater than N; and left-shifting a result of the right-shift by M bits.

12. The method as recited in claim 11, wherein M is a power of two which is greater than or equal to 32.

13. The method as recited in claim 8, wherein responsive to detecting the request to perform the second type of instruction, the method further comprising:

performing a plurality of multiplication operations on separate portions of a first source operand and a second source operand;

generating a first result from multiplying a first portion of the first source operand by a first portion of the second source operand;

left-shifting, by a first number of bits, a second result generated by multiplying the first portion of the first source operand by a second portion of the second source operand;

left-shifting, by the first number of bits, a third result generated by multiplying a second portion of the first source operand by the first portion of the second source operand;

left-shifting, by a second number of bits, a fourth result generated by multiplying the second portion of the first source operand by the second portion of the second source operand; and adding together, subsequent to shifting, the first result, second result, third result, and fourth result to generate a product of the first source operand and the second source operand.

14. The method as recited in claim 13, wherein the second number of bits is greater than the first number of bits, and wherein the second number of bits is at most twice as much as the first number of bits.

15. An apparatus comprising:
a plurality of multipliers; and
shifting logic for shifting element product results generated by the plurality of multipliers;
wherein the apparatus is configured to:
responsive to detecting a request to perform a first type of instruction on a plurality of source operand elements:
perform a plurality of multiplication operations on the plurality of multipliers to generate a plurality of element product results; and
perform a right-shift operation on at least one of the element product results;
perform a single multiplication operation on the plurality of multipliers responsive to detecting a request to perform a second type of instruction on the plurality of source operand elements;
wherein the first type of instruction has source operand elements of a first size and the second type of instruction has source operand elements of a second size different from the first size; and
generate a result from executing one of the first type of instruction and the second type of instruction.

16. The apparatus as recited in claim 15, wherein the apparatus is configured to:
generate a plurality of element product results from the plurality of multiplication operations between a first set of source operand elements and a second set of source operand elements; and
determine a maximum element product result of the plurality of element product results.

17. The apparatus as recited in claim 16, wherein responsive to detecting the request to perform the first type of instruction, the apparatus is configured to perform a right-shift operation on each element product result other than the maximum element product result.

18. The apparatus as recited in claim 17, wherein responsive to determining that a third source operand is greater than the maximum element product result, the apparatus is configured to:
determine a number N of bits which the third source operand should be shifted left, wherein N is a positive integer;
right-shift the third source operand by (M−N) bits, wherein M is an integer which is a power of two, and wherein M is greater than N; and
left-shift a result of the right-shift by M bits.

19. The apparatus as recited in claim 18, wherein M is a power of two which is greater than or equal to 32.

20. The apparatus as recited in claim 15, wherein responsive to detecting the request to perform the second type of instruction, the apparatus is configured to:
perform a plurality of multiplication operations on separate portions of a first source operand and a second source operand;
generate a first result from multiplying a first portion of the first source operand by a first portion of the second source operand;
left-shift, by a first number of bits, a second result generated by multiplying the first portion of the first source operand by a second portion of the second source operand;
left-shift, by a first number of bits, a third result generated by multiplying a second portion of the first source operand by the first portion of the second source operand;
left-shift, by a second number of bits, a fourth result generated by multiplying the second portion of the first source operand by the second portion of the second source operand; and
add together, subsequent to shifting, the first result, second result, third result, and fourth result to generate a product of the first source operand and the second source operand.

* * * * *